United States Patent

[11] 3,566,944

[72] Inventor Sydney E. Tilby
 Winterburn, Alberta, Canada
[21] Appl. No 692,237
[22] Filed Dec. 20, 1967
[45] Patented Mar. 2, 1971
[73] Assignee Canadian Cane Equipment, Ltd.
 Montreal, Quebec, Canada

[54] METHOD FOR PREPARING SUGARCANE STALKS FOR SUBSEQUENT PROCESSING
 10 Claims, 15 Drawing Figs.
[52] U.S. Cl. .................................................. 146/222,
 198/33, 198/30, 198/76, 146/117, 146/224
[51] Int. Cl. ........................................................ B07b 4/08,
 B26d 7/00
[50] Field of Search ........................................ 146/222,
 280, 116.1, 117; 56/16; 130/30; 198/33 (B-1), 30, 76

[56] References Cited
UNITED STATES PATENTS
| | | | |
|---|---|---|---|
| 68,345 | 9/1867 | Brown | 146/222 |
| 402,082 | 4/1889 | Hughes | (146/116.1UX) |
| 2,336,775 | 12/1943 | Brest | 198/76X |
| 3,113,574 | 12/1963 | Greedy et al. | 198/33(.1)X |
| 3,325,982 | 6/1967 | Fogels et al. | 56/16X |

Primary Examiner—Willie G. Abercrombie
Attorney—Burns, Doane, Benedict, Swecker & Mathis ABSTRACT: A method for preparing a mass of randomly oriented, slender cane stalks for subsequent processing at a selected location. The method is intended to deliver the stalks in cleaned condition, chopped into uniform, relatively shorter lengths and aligned longitudinally in their direction of motion. The method includes delivering the mass of stalks to a series of successively, more rapidly moving, conveyor means and subjecting the stalks to sudden vertical deflections at some of various junctions between adjacent ones of the conveyor means. At some of the junctions heavy debris (such as rocks) mixed with the stalks is caused to gravitate rearwardly and downwardly between adjacent ones of the conveyor means. At least one junction, leading portions of the stalks in the mass are also subjected to a force in a downstream direction aligned with their direction of travel upstream of the one junction. At another junction concurrently with vertical motion the canes are also subjected to a force in a direction downstream of the other junction, inclined transversely to direction of travel of the canes upstream of the other junction to exert a disentangling effect on the canes. The canes are progressively thinned out and aligned in the direction of travel and, at a point where substantially all the stalks are aligned in the direction of travel, they are chopped into shorter lengths while moving longitudinally. The chopped lengths are then realigned. At some point in their travel, the stalks are projected at high velocity across a vertical discontinuity in the conveyor means to cause the stalks to become partially airborne, at which time fluid is directed through the stalks to remove trash.

Apparatus for preparing a mass of randomly oriented, slender cane stalks for subsequent processing includes a series of separate conveyors successively receiving the stalks. Some of the conveyors in the series are arranged with their downstream ends spaced vertically above and overlapping the upstream ends of the next succeeding conveyors to define cascading junctions, between adjacent conveyors at which a vertical deflection is imparted to the stalks.

At least one pair of successively related, cascading conveyors have their respective directions of travel aligned and another pair of successively related, cascading conveyors have their respective directions of travel transversely inclined. With this arrangement, the stalks are subjected to simultaneous vertical and accelerating forces, the latter being at separate times in different perpendicularly related directions, thereby facilitating disentangling and alignment of the canes.

A chopping means is positioned adjacent one of the conveyor means positioned sufficiently downstream, at a point where almost all of the canes are travelling longitudinally. The chopping means cuts the stalks transversely thereof into uniform shorter lengths, while they are moving longitudinally. Realigning means positioned adjacent the chopping means realign the chopped lengths of stalk in parallel relation.

At some point in their travel, the conveyor means project the stalks at sufficiently high velocity across a transversely extending, vertical discontinuity in the series of conveyor means to cause the stalks to become at least partially airborne during which time fluid-directing means directs fluid through the stalks to remove trash.

PATENTED MAR 2 1971 3,566,944
SHEET 1 OF 3
FIG.1
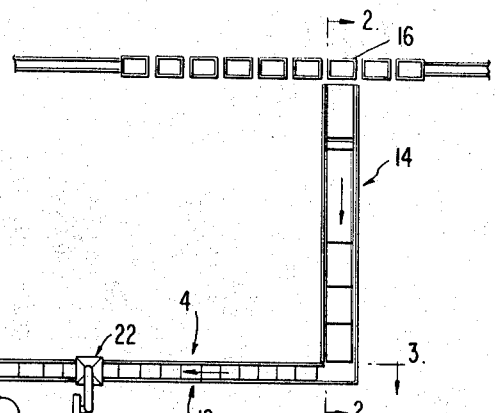
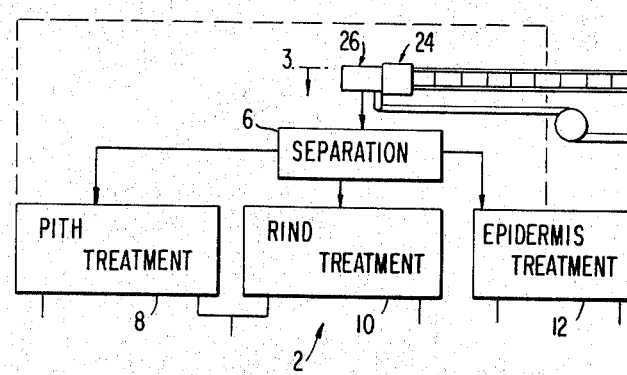
FIG.12
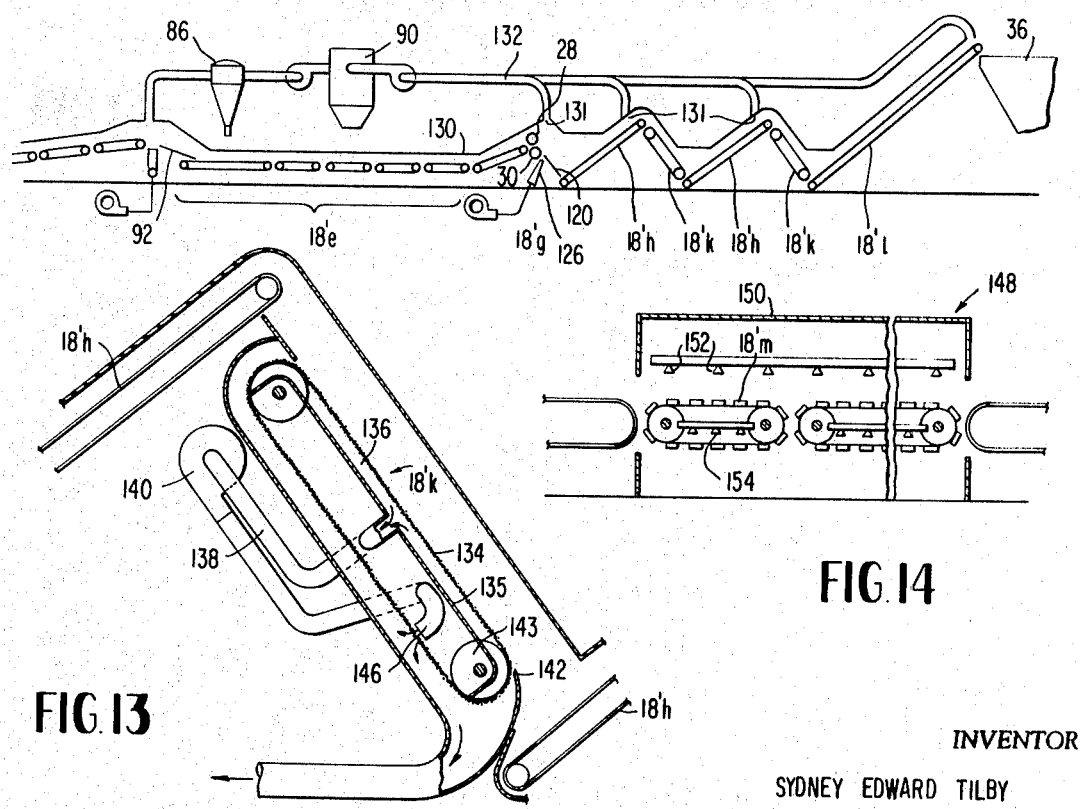
FIG.13
FIG.14
INVENTOR
SYDNEY EDWARD TILBY
BY Burns, Doane, Benedict, Swecker & Mathis
ATTORNEYS

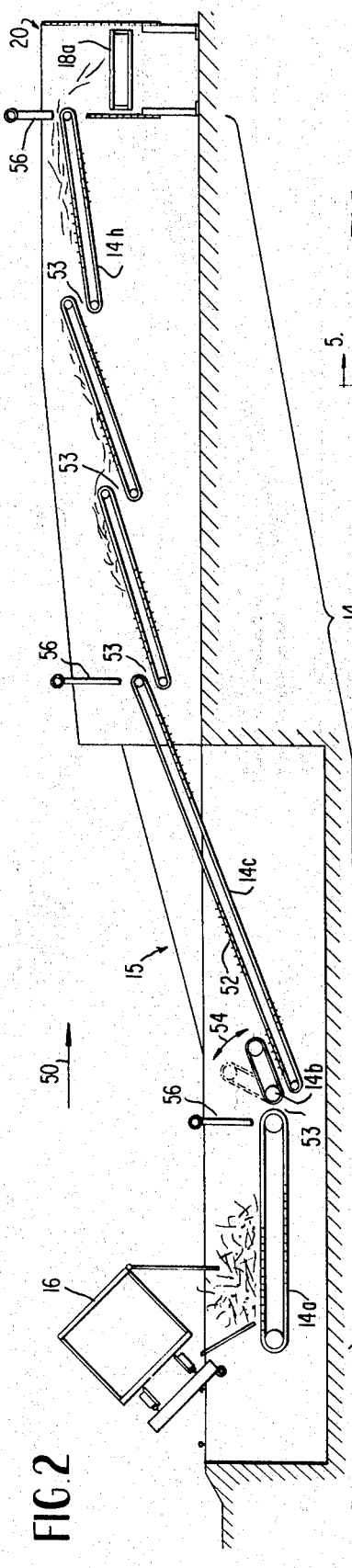
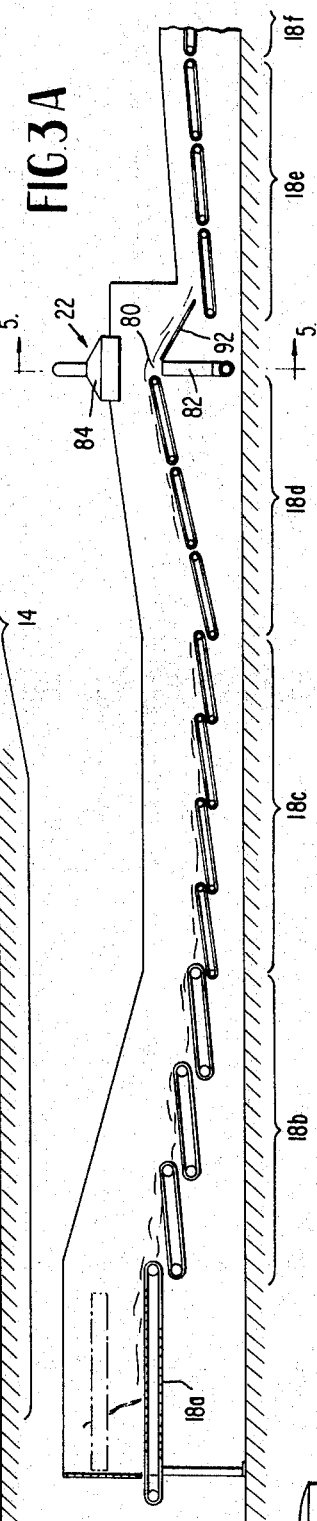
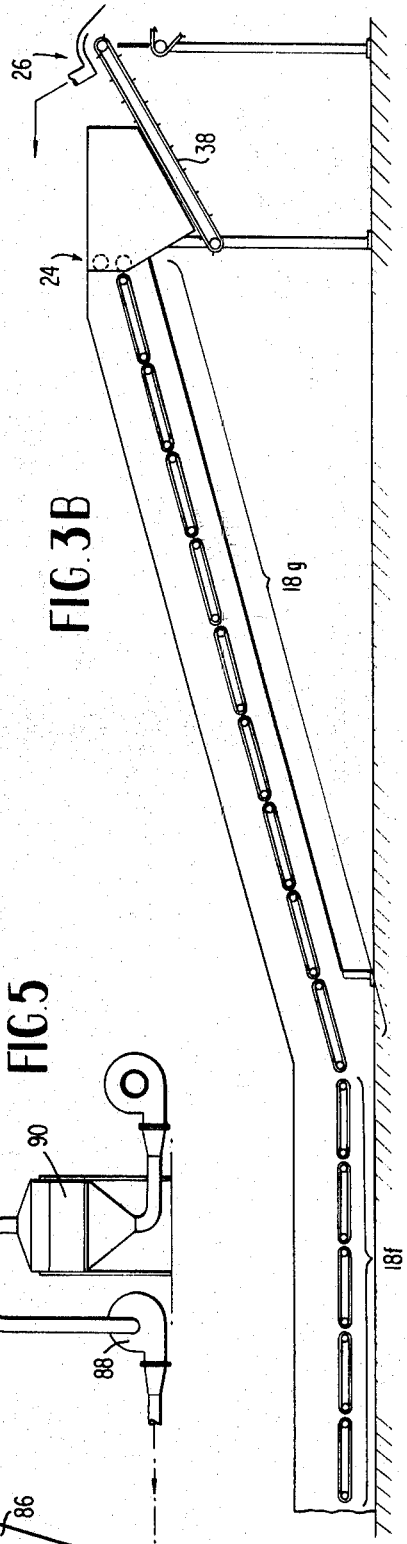
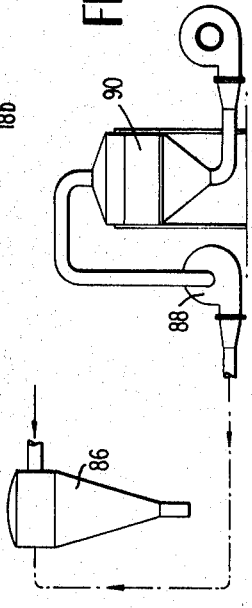

PATENTED MAR 2 1971

METHOD FOR PREPARING SUGARCANE STALKS FOR SUBSEQUENT PROCESSING

BACKGROUND OF THE INVENTION

This invention relates to a method for preparing sugarcane stalks for subsequent processing, and in particular to a method and apparatus intended to receive a bulk load of randomly oriented sugarcane stalks and to thereafter deliver the stalks to a selected work station in cleaned condition, chopped into uniform, relatively shorter lengths. A secondary function of the invention is to arrange for the chopped stalks to be aligned longitudinally in a common feed direction.

The present application is directed to a portion of a system for processing sugarcane. The system, as a whole, embraces various stages involving feeding, splitting and depithing of the stalks with subsequent separation of the sugar from the pith.

The present application is directed to the above-discussed feeding portion of the system. This portion is intended to receive a bulk load of stalks from a suitable source, such as for example a rail car or any other conventional source of delivery of sugarcanes from the fields and to deliver the stalks at the sugar recovery plant in cleaned condition, with the individual canes chopped into relatively shorter lengths. As a secondary or collateral purpose, the chopped stalks are arranged to be aligned in parallel, longitudinal relation traveling in a common feed direction to a delivery point. Although the present system has, for general informational purposes, been described with reference to one particular sugarcane processing system for which it is suitable, it will be appreciated that use of the present system is not restricted to the particular system discussed, and that it may be used with equal facility in other sugar processing systems.

In preparing sugarcane stalks for subsequent processing, it has been known to utilize machinery adapted to automatically cut the cane stalks (which frequently grow in a bent and distorted configuration) into shorter lengths to facilitate subsequent processing. It has also been known to combine cutting of the stalks with a trash removal operation by blowing air through the mass of stalks to carry away trash. In this connection, reference may be made to the following U.S. Pat. Nos.: Tiedtke, 2,621,461; Moragne, 2,544,275; and Faulkener, 1,990,172.

Such previous devices may not, however, prove suitable for the preparation of masses of randomly oriented sugarcanes delivered in bulk during the performance of large-scale sugar processing operations. For example, such prior devices have generally been adapted to receive stalks arranged in some form of preexisting parallel alignment (either, for example, growing upright in rows in the fields or already cut down by laborers and laid in horizontal, parallel rows) permitting the stalks to be fed transversely of their length directly to cutting knives usually disposed in spaced parallel relation. Such prior devices would not be suitable for dealing with a large, tangled mass of randomly oriented sugarcane stalks, such as would be dumped in bulk from a railway car or the like. Furthermore, even if such randomly oriented stalks were fed directly into spaced parallel cutting knives, it is likely that significant proportion of the stalks, due to this random situation of the mass, would encounter the knives at a relatively oblique inclination so that the chopped stalks would be of widely varying, unequal lengths.

It would therefore be desirable, and unobvious in view of the teachings of the prior art, to provide a system for aligning the stalks in parallel relation so that they may be fed uniformly to equally spaced cutting knives to provide uniform chopped lengths of stalk.

It has been proposed in other environments, such as canning, to align a mass of randomly oriented tubular articles (metal cans) by feeding the articles along a series of successively more rapidly moving conveyors aligned in a single feed direction, with successive conveyors being downwardly spaced from each other, so that the articles experience concurrent falling and downstream jerking motions tending eventually to align then longitudinally in the feed direction. Although the arrangement is generally satisfactory for straight, tubular, manufactured articles such as the aforementioned metal cans, particular problems arise in the handling of naturally grown sugarcane stalks. A high proportion of stalks grow in a bent and twisted configuration which causes the stalks to become closely tangled together during their transportation in bulk from the fields. In this condition, many of the stalks are likely to have their bent portions hooked about other cane stalks in such relation as to permit the interengaged canes to be freed only by movement of the stalks within the mass in a direction transversely of the direction of travel thereof. However, prior aligning systems, of the type described, provide dislodging forces only in the one direction of travel of the mass of stalks, which would leave many of the canes firmly entangled.

Another problem particularly associated with bulk masses of sugarcane stalks transported from the fields may arise due to the presence, amongst the stalks, of heavy debris such as large rocks and the like. If not removed, such debris may cause serious damage to other portions of the apparatus such as the cutting knives. It is advisable, therefore, that provision be made for the early removal of such unwanted, heavy debris from the mass of stalks. Other lighter trash such as leaves, broken fragments of stalk and the like are advisably removed at some other point in the process.

For these, other reasons, there is a real need at the present time for a method and apparatus for receiving a bulk mass of randomly oriented sugarcane stalks, detrashing the cane, that is, removing extraneous material such as rocks, field dirt, tramp metal and leaves; and then delivering the cane for subsequent processing.

SUMMARY OF THE INVENTION

It is therefore a general object of the invention to provide a method for preparing a mass of randomly oriented sugarcane stalks for subsequent processing, which method is intended to obviate problems of the type previously described.

It is a primary object of the invention to provide a method for receiving a mass of randomly oriented sugarcane stalks in bulk, adapted to deliver the cane stalks in cleaned condition, chopped into uniform, shorter lengths, for subsequent processing.

It is another object to provide a method adapted to operate on a bulk mass of tangled, randomly oriented sugarcane stalks in such a manner as to disentangle and thin out the stalks so that they may subsequently be aligned longitudinally for delivery to a selected location.

It is a further object of the invention to provide a method to facilitate removal of heavy debris mixed with the sugarcane stalks therefrom, at an early stage.

It is one further object of the invention to provide a method utilizing an airblast to remove trash from sugarcane stalks, whereby clogging of the trash amongst the stalks during removal is effectively minimized.

One method aspect of a preferred embodiment of the present invention intended to accomplish at least some of the foregoing objects is intended to prepare a mass of randomly oriented, slender cane stalks for subsequent processing. The method includes the steps of delivering the mass of cane stalks onto conveyor means, aligning the stalks longitudinally in the direction of travel of the conveyor means, chopping the stalks transversely into relatively shorter lengths, and delivering the chopped stalks to a selected location. At some point, fluid is directed through the stalks to remove trash.

Another method aspect resides in positioning adjacent conveyor means in series in such a manner as to facilitate downward gravitation of debris carried with the stalks in a direction rearwardly relative to the direction of travel of the mass of stalks.

An additional method aspect embraces the steps of delivering the mass of cane stalks to conveyor means, accelerating the mass of cane stalks, aligning the stalks longitudinally in the direction of travel of the conveyor means, and projecting the mass of stalks at high velocity across a transversely extending, vertical discontinuity in the conveyor means to cause the mass of stalks to become at least partially airborne. Fluid is directed transversely through the mass of stalks during their airborne condition to remove trash.

Another particularly significant method aspect of the invention intended to disentangle, thin out and align the stalks includes delivering the mass of stalks to the first of a series of separate conveyor means, and subjecting the mass of stalks to a sudden vertical deflection at a first junction between two of the conveyor means in the series. At the same time, the leading portions of the individual stalks in the mass are subjected to a force in the direction of travel of the one of the two conveyor means downstream of the first junction, with the directions of travel upstream and downstream of the first junction linearly aligned, tending to accelerate the individual stalks in the direction of travel of the receiving conveyor. The stalks are then subjected to another vertical deflection at a second junction between the successive conveyor means of the series, and simultaneously subjected to a force in the direction of travel of the conveyor means downstream of the second junction, but with the directions of travel upstream and downstream of the second junction respectively inclined in transverse relation. The perpendicularly related, successive jerking motions thus imparted to individual cane stalks tends to free them from their tangled relation in the mass, whichever way they are oriented in the mass, and successively accelerate, thin out and align the stalks.

Another method aspect connected with the aligning and thinning steps includes performing some of the aforementioned, vertical deflecting steps in vertically opposite directions.

In other method aspects of the invention, the stalks are chopped transversely of their length into uniform shorter lengths while the stalks are traveling longitudinally. Thus the stalks, which may be unmanageably bent along their total length, are reduced into smaller portions which are of such short length as to include insufficient curvature to hamper subsequent processing.

An apparatus according to a preferred embodiment of the invention for preparing a mass of randomly oriented, slender cane stalks for subsequent processing includes conveyor means adapted to convey the mass of stalks in a feed direction. Aligning means, operatively connected with the conveyor means, are adapted to align the stalks longitudinally in the direction of travel of the conveyor means. Chopping means, operatively connected with the conveyor means, are adapted to chop the stalks transversely thereof into relatively shorter lengths while the stalks are traveling longitudinally. At some point during their conveyed motion, means are provided whereby the stalks are subjected to fluid directed through the stalks to remove trash.

In another apparatus aspect of the invention, conveyor means are provided to project the stalks, at high velocity, across a vertical discontinuity therein to cause the stalks to become at least partially airborne. While the stalks are at least partially airborne, fluid is directed transversely through the airborne stalks by fluid directing means operatively connected with the conveyor means.

To perform the functions of disentangling the cane stalks in the bulk mass and aligning them longitudinally in the direction of travel, important apparatus aspects of the invention include a first pair of separate, successively related conveyor means having their directions of travel linearly aligned. This pair of conveyor means defines a first junction adapted to subject the mass of stalks to an abrupt vertical deflection and simultaneously subject the leading edge portions of the stalks in the bass to a force in the direction of travel of the one of the first pair of conveyor means receiving the stalks downstream of the first junction. A second pair of separate, successively related conveyor means define a second junction. At this junction, the pair of conveyor means are adapted to subject the mass of stalks to a sudden vertical deflection and simultaneously subject the leading edge portions of the stalks to a force in the direction of travel of the one of the second pair of conveyor means receiving the stalks downstream of the second junction. However, the receiving one of the second pair of conveyor means is positioned so as to have a direction of travel inclined transversely of the direction of travel of the one of the second pair of conveyor means upstream of the second junction. Thus, individual canes are individually subjected to intermittent, abrupt vertical deflection, with successive applications of force to the leading edges of individual canes being in different perpendicularly related directions and tending to disentangle the canes from each other and align them longitudinally with their direction of travel.

In another aligning aspect, provision is made for subjecting the mass of stalks, at the various junctions between successive ones of the conveyor means, to vertical deflections in an upward direction as well as a downward direction.

Other apparatus aspects of the invention reside in the provision of chopping means which alternately, grippingly advance and then cut the stalks while they are traveling longitudinally to provide chopped portions of uniform length. Also significant is the provision of means for realigning the chopped portions of stalk subsequent to chopping. The means for realigning the chopped portions of stalk includes a plurality of parallel, spaced ribs. Alternate ones of the ribs are higher than intermediate ribs and are transversely spaced a distance greater than the length of chopped stalk. The adjacent, high and low ribs are spaced a distance significantly less than this length. It is thus impossible for any chopped portions of stalk to fall in bridging relation across two high ribs of the same height. The chopped portions of talk thus tend to fall into aligning channels defined by adjacent high and low ribs. These ribs may extend in a parallel, aligned direction above further conveyor means moving longitudinally beneath the ribs.

THE DRAWINGS

One preferred embodiment of the present invention is illustrated in the accompanying drawings, in which:

FIG. 1 is a simplified plan view of a representative sugar cane processing plant utilizing an apparatus constructed in accordance with the present invention to feed canes initially delivered in bulk, in aligned, cleaned, chopped condition to the plant;

FIG. 2 is a simplified, side view of a first series of conveyors forming part of the apparatus shown in FIG. 1 taken along the lines 2–2 therein;

FIG. 3a is a side view of a first part of a second series of conveyors forming a part of the apparatus shown in FIG. 1 taken along the lines 3–3 therein;

FIG. 3b is a view of a second part of the second series of conveyors shown in FIG. 3a extending continuously from the portion shown therein;

FIG. 5 is a side view of a detrashing apparatus forming a part of the apparatus shown in FIG. 3a taken along the lines 5–5 therein;

FIG. 12 is a simplified side view of a first alternative embodiment of the invention;

FIG. 13 is a side view on an enlarged scale of a portion of the first alternative embodiment of the invention shown in FIG. 12; and FIG. 14 is a representational side view of a water spray bath forming a part of a second alternative embodiment of the present invention.

DETAILED DESCRIPTION

General Summary

Figures 4, 6, 7, 8, 9, 10, 11:
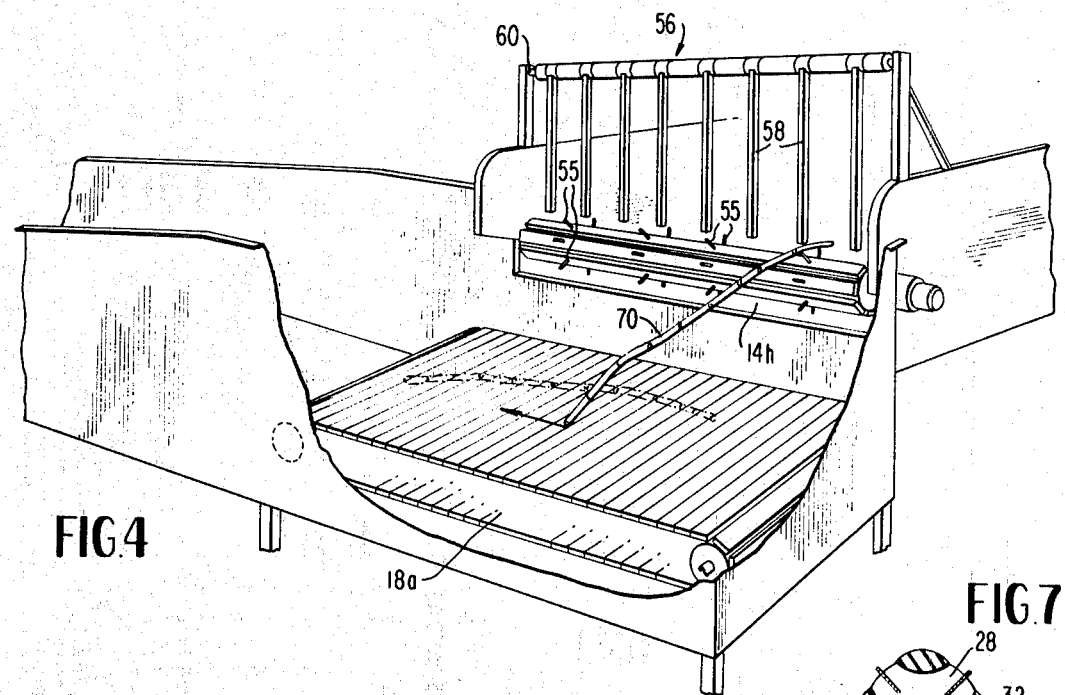
FIG. 4 is a perspective, partially broken-away view of a right angle junction between the first and second series of conveyors shown in FIG. 1.
FIG. 6 is a side view of a stalk chopping and realigning section forming a portion of the apparatus shown in FIG. 3b.
FIG. 7 is a simplified, cross-sectional side view of chopping apparatus forming a part of the apparatus shown in FIG. 6.
FIG. 8 is a plan view of realigning apparatus for realigning the stalks subsequent to chopping, forming a part of the apparatus shown in FIG. 6.
FIG 9 is a cross-sectional end view of the realigning apparatus shown in FIG. 6 taken along the lines 9–9 therein.
FIG. 10 is a cross-sectional end view of the realigning apparatus shown in FIG. 6 taken along the lines 10–10 therein.
FIG. 11 is a cross-sectional end view of the realigning apparatus shown in FIG. 6 taken along the lines 11—11 therein.

Referring to FIG. 1 of the drawings, one particular sugarcane processing plant, generally designated 2, is there shown utilizing an apparatus 4, to supply sugarcane to the plant.

The sugarcane processing plant 2 may include a separation unit 6 for splitting individual cane stalks longitudinally and separating the cane rinds from the pith (core material of the cane), and adapted to feed the separated pith, the rind and the epidermis to separate pith, rind, and epidermis treatment units 8, 10, and 12, respectively.

However, it will be appreciated that the apparatus 4 of the present arrangement may alternatively be used to supply cane to other known forms of sugarcane processing plants, as desired.

The apparatus 4 of the present invention includes a first series 14 of successively related, separate conveyor means adapted to convey cane stalks in large, randomly oriented, bulk masses dumped from rail cars 16. The canes may also be dumped from other conventional forms of transport for sugarcanes in bulk from the fields, such as, for example, trucks, cranes, carts, and the like.

The separate conveyors in the first series 14 run at successively higher speeds. Adjacent delivering and receiving portions of most of the successive conveyors in the first series 14 are arranged in overlapping relation (FIG. 2) so that as the canes pass from one conveyor to the next, they are subjected to an abrupt vertical deflection or cascade. The leading cascaded portions of individual canes in the mass, when engaged by the higher velocity downstream conveyor, are subjected to jerking forces in the downstream direction. The combined effect of the deflecting motion and jerking force causes an initial loosening of the tangled mass of canes. The cascade junctions cause heavy debris mixed with the cane, such as boulders from the fields, to gravitate downwardly between adjacent conveyors, in a direction rearwardly of the direction of travel of the canes. As the canes travel progressively along the first series 14 of conveyor means, then progressive acceleration tends to cause the mass to become thinned out in the direction of travel.

The cane stalks are transferred from the first series 14 of conveyors to a faster moving, second series 18 of conveyors (FIGS. 3a and 3b). Series 18 is disposed transversely of the first series 14 to define a right angle junction 20 (FIG. 4) between the first and second series of conveyors.

At the junction 20, the canes are subjected to another vertical displacement and at the same time, the leading portions of the canes falling onto the first of the second series 18 are subjected by frictional contact therewith to a downstream accelerating force. This force imparts a strong, jerking force to the leading portions of the canes, which force is inclined transversely of the direction of cane travel upstream of the junction 20. At this time, any canes which have so far been entangled in such relation as to be unaffected by the preceding jerking motions in the direction of travel of the first series 14 of conveyors, are suddenly subjected to a jerking force in a direction at right angles to that previously experienced. This effect has been found to contribute very substantially to a disentangling and breaking up of the mass of canes at the junction 20.

At the same time centrifugal force acting on the canes in the top part of the mass at the junction 20 during the turn causes the upper canes to topple laterally outwardly onto the conveyor downstream of the junction 20 to cause considerable lateral spreading of the canes. The succeeding conveyors in the first series 18 are also arranged in successively more rapidly moving relation so that the individual stalks continue to be progressively thinned and aligned until substantially all of the stalks are aligned in the direction of travel of the second series 18 of conveyors.

During their travel along the second series 18 of conveyors, the stalks are passed through a detrashing station 22 (FIG. 5). At this station, the stalks are projected at high velocity across a vertical discontinuity in the second series 18 of conveyors to cause the stalks to become at least partially airborne. At this time, fluid is directed upwardly through the stalks to remove trash therefrom with the partially airborne relation between the stalks preventing clogging of the trash among them, thus facilitating removal. The trash is subsequently conducted away, separated, and disposed of.

At the downstream end of the second series 18 of conveyors, the stalks are delivered to a chopping unit 24 (FIGS. 6 and 7) where they are chopped transversely of their length into shorter portions, of uniform length, while moving longitudinally of their length. The chopped portions of stalk are then realigned at a realigning unit 26 into parallel relation, moving longitudinally in the direction of travel for delivery to the processing plant 2.

The chopping unit 24 includes two mating, transversely extending, power driven, cutting rolls 28 and 30 provided with alternately spaced, transversely extending, peripherally mounted, gripping and cutting members 32 and 34. Members 32 and 34 alternately grippingly advance the individual canes and sever them transversely. The chopped portions of stalk fall into a hopper 36 from which they are delivered by an upwardly inclined conveyor 38 to the realigning unit 26.

The realigning unit 26 includes a realigning cage 40. Cage 40 is positioned above a delivery conveyor 42, moving longitudinally of the cage 40. The cage 40 includes a plurality of longitudinally extending ribs with alternate ribs being relatively high and spaced transversely apart by a distance slightly more than the length of the chopped portions of stalk. With this arrangement, the chopped stalk cannot fall in bridging relation across any two relatively high ribs. The ribs intermediate the high ribs are relatively low and spaced from the adjacent high ribs by a distance substantially less than the chopped cane length. The cane lengths are thus induced to fall downwardly between adjacent high and low ribs and are then skewed toward longitudinal alignment. The conveyor 42 carries the lengths between adjacent ribs, which are progressively, longitudinally converged, in the feed direction of the cane lengths.

It will be appreciated that various modifications in the relative positioning of various parts of the layout just described may be made. For example, the chopping unit could be positioned at some point in the second series of conveyors 18 intermediate the detrashing unit 22 and the hopper 36 with other detrashing units provided between the chopping unit and or at the hopper. Similar variations in the relative location of other portions of the apparatus falling within the invention defined with more particularity in the appended claims, may be provided.

The First Series of Conveyors

The previously mentioned first series 14 of conveyors includes a plurality of power driven, separate, endless conveyors mounted on a conventional framework. These conveyors have their directions of travel aligned in a common first feed direction, indicated by the arrow 50 in FIG. 2, with the conveyors arranged to successively convey the mass of stalks. Each of the conveyors, in the first series 14, is of heavy duty construction slatted type comprising a plurality of parallel slats extending transversely of the direction of motion of the conveyor and joined together by flexible connections along their adjacent longitudinal edges.

The first series 14 of conveyors includes a horizontally disposed, cane table or first conveyor 14a in the series positioned to receive intermittently dumped, bulk loads of sugarcane stalks comprising several tons at a time. Such loads are supplied from a suitable conventional source of supply, such as, for example, the previously mentioned rail car 16 which, as illustrated in FIG. 2, may be of the side unloading, tilt type. It will be appreciated that other conventional methods of loading the first conveyor 14a, such as the use of a crane and slings, may be accommodated.

The canes are delivered from the downstream end of the first conveyor 14a to a metering conveyor 14b, next in the series. The metering conveyor 14b moves considerably faster than the first conveyor (for example, a speed differential of 200 feet per minute may be provided) and provides a very substantial thinning out of the mass of cane stalks due to the sudden acceleration of the stalks in passing between the conveyors 14a and 14b. The metering conveyor 14b which has its lower end adjacent and on a level with the delivery end of the conveyor 14a, is mounted to adjacent supporting structure for pivotal motion in the vertical plane about its lower end. The upper, delivery end of the conveyor 14b may be elevated vertically by conventional means (not shown) under the control of an operator to vary the inclination of the metering conveyor 14b relative to the first conveyor 14a. As sugarcane stalks move off the first conveyor 14a, normally in heaps, the operator may selectively control the speed and inclination of the metering conveyor 14b in order to break up the heaps and distribute the mass of stalks evenly onto the next succeeding conveyor 14c in the series 14.

Succeeding conveyors in the first series 14 downstream of the metering conveyor 14b are arranged with the downstream end of each conveyor spaced above and slightly upstream of the upstream end of the next succeeding conveyor to define gaps 53 between the adjacent conveyors. As the mass of stalks passes between conveyors it undergoes a vertical drop or cascade which loosens and helps to disentangle the canes. This cascade also causes heavy debris, such as boulders and the like, mixed with the mass of stalks, to gravitate downwardly from the mass of stalks and fall outwardly and rearwardly through the gaps 53 between adjacent conveyors in the first series 14.

The various conveyors in the first series 14 are arranged to run at successively higher speeds so that the leading portions of individual stalks in the mass, during their passage across each junction defined by adjacent conveyors, are subjected to a downstream frictional accelerating force simultaneously with the disentangling, vertical falling motion previously discussed. This results from the lower ends of the cascading stalks engaging the upstream end of the relatively high velocity downstream conveyor at the cascade junction.

These combined forces exert a strong loosening and disentangling effect upon the cane stalks in the mass, which assists in thinning the stalks out in the direction of travel.

Thinning of the stalks is also substantially contributed to by the provision of pins 52 provided on the conveyor 14c and the conveyors downstream thereof in the first series 14. The pins 52 are secured to and project outwardly from the slats in longitudinally aligned rows. The pins 52 exert a "carding" effect, holding back the lower stalks in the mass with which the pins 52 are in contact relative to those in the upper part of the mass during transfer of the mass between adjacent conveyors. Thus, the upper stalks tend to be projected on ahead of the lower stalks at the junctions, thereby thinning out the mass in the direction of travel.

Thinning is further effected by the provision of a plurality of rakes 56 spaced in the direction of travel, overhanging and extending transversely of the path of travel of the mass of stalks.

Each of the rakes 56 (see also FIG. 4) includes a plurality of heavy, vertical fingers 58 spaced transversely of the feed direction. The lower ends of the fingers are spaced a short distance above adjacent ones of the conveyors in the first series 14. The upper ends of the fingers are pivotally secured, for free-swinging motion in a vertical plane, to a transverse support 60 fixedly secured to portions of the general surrounding structure. As the mass of stalks pass the rakes 56, stalks traveling in the upper part of the mass tend to be retarded by the rakes 56 to a greater extent than those in the lower part of the mass, thus contributing to progressive thinning of the stalks in the direction of travel, as well as lateral thinning.

By the time the stalks reach a final conveyor 14n of the conveyors in the first series 14, substantially all the heavy debris comprising rocks and the like has been removed by passage through the gaps 53 between adjacent conveyors in the manner previously described. At the same time, the stalks have been quite substantially thinned out in the direction of travel and laterally, so that the vertical thickness of the mass of stalks on the conveyor 14n is less than on the conveyor 14a. At the same time, the jerking effects provided in the manner discussed by the speed differential between adjacent conveyors, will have caused some proportion of the individual stalks in the mass to have become at least better aligned longitudinally in the direction of travel.

The Second Series of Conveyors

The previously mentioned second series 18 of conveyors includes a plurality of successively related groups or flights of conveyors 18a—18g each consisting of one or more separate endless belt conveyors.

The mass of stalks on the final conveyor 14n in the first series 14 are delivered to the first conveyor flight 18a (comprising a single conveyor) in the second series 18 of conveyors. (See FIG. 4).

The conveyor 18a is of the power driven, endless, heavyduty, parallel slat type, described for the conveyors in the first series 14. However, a conventional flexible belt type of conveyor could alternatively be used, if desired. The conveyor 18a is supported in horizontal disposition, by conventional framing, so as to receive canes delivered from the conveyor 14n. Conveyor 18a is spaced vertically below the discharge end of conveyor 14n to cause the canes to undergo falling or cascading motion during their transfer from the conveyor 14n to the conveyor 18a. Furthermore, the conveyor 18a is driven to convey the canes away from the conveyor 14n in a direction transversely of the direction of travel thereof and at relatively higher speed.

The effect of this arrangement of the conveyors 14n and 18a, on an individual cane stalk, is shown with reference to an individual stalk 70 indicated in dotted lines on FIG. 4. As the stalk 70 leaves the conveyor 14n, its forward end soon starts to fall under gravity towards the conveyor 18a with the stalk still moving generally forwardly in the direction of travel of the conveyor 14n. As the leading end of the stalk 70 impinges upon the conveyor 18a, frictional engagement of the leading end of the stalk 70 with the conveyor 18a imparts an accelerating force to the leading end of the stalk 70 in the downstream direction of travel of the conveyor 18a.

Thus, the stalk 70 is jerked in a direction transverse to that in which the cane 70 has previously been subjected to such jerking motion. At the same time, the rearward end of the cane 70 tends to be relatively retarded, not only by the inertia of the stalk itself, but frequently because of engagement of the rear end of the stalk 70 with other canes in the mass or because of the engagement of the rear end of the stalk either with the pins 52 on the conveyor 14n or with the fingers 58 of the rake 56. The net effect of these forces on the individual cane stalk is to apply a force couple tending to rotate the stalk in a direction tending to align it with the direction of travel of the receiving conveyor 18a.

This combination of forces has been found to tend to disentangle the cane stalks, which are otherwise prone to remain in their tangled condition due to their usually bent and twisted configuration.

The stalks are also spread laterally at the junction 20. The stalks in the upper part of the mass are affected by centrifugal force during abrupt motion around the bend 20 (to a greater extent than those in the lower part of the mass) with the result that the upper stalks are toppled radially outwardly during their passage through the right angle junction 20 to spread the mass of stalks laterally across the conveyor 18a.

In summary, the provision of the right angle junction at which the stalks are subjected to abrupt vertical deflection and to simultaneous accelerating force in a downstream direction transverse to the direction of travel of the stalks upstream of the junction, causes very considerable disentangling of the stalks and also provides substantial lateral spreading of the stalk downstream of the junction in highly desirable manner.

Although only one right angle junction 20 has been disclosed, it will be appreciated that a plurality of such right angle, cascading junctions might be provided if desired.

The initial conveyor 18a delivers the stalks to the first conveyor of a second flight of conveyors 18b in the second series 18.

By this time, the stalks have become sufficiently thinned to make it no longer necessary to provide conveyors of heavy-duty construction of the type hitherto described. The conveyors in the flight 18b therefore and all succeeding conveyors downstream are of lighter-weight construction, utilizing conventional, elastomeric, conveyor belting material.

The conveyor 18a and the various conveyors in the second flight 18b have their adjacent downstream and upstream ends vertically spaced in the manner disclosed in connection with the first series 14. These conveyors, 18a and the conveyors in the flight 18b, further assist in the removal of any debris which may still be mixed amongst the mass of the stalks by providing cascade gaps between adjacent conveyors. Trash gravitates through these gaps in a direction downwardly and rearwardly of the direction of travel of the mass of stalks in the manner previously described for the first series 14. By the time the stalks have reached the last conveyor in the second flight 18b, substantially all of the heavy debris from the fields has been removed.

Downstream of the second conveyor flight 18b, the mass of stalks is delivered to a third flight 18c of conveyors arranged with their adjacent delivering and receiving ends in overlapped relation similar to that previously described, but with a smaller vertical gap between adjacent conveyors sufficient only to avoid interference between them. The conveyors in the third flight 18c are driven at progressively higher speeds so as to continue to impart simultaneous falling and jerking motions to the stalks, tending to thin out and align the stalks in the mass. By the time the cane has reached the delivery end of the last conveyor in the third flight 18c, the numerous preceding jerking and straightening motions imparted to the canes have caused the mass of stalks to become sufficiently thinned and disentangled to make it unnecessary to provide for continued abrupt dropping of the cane between successive adjacent conveyors.

Thus, the conveyors in the next succeeding, fourth flight 18d of conveyors, receiving the stalk from the last of the conveyors in the third flight 18c, are no longer arranged in mutually overlapping relation at their adjacent delivery and receiving ends. Instead, the conveyors of the next succeeding group, 18d, are arranged with their upper conveying surfaces aligned in a common plane. The conveyors in the fourth flight 18d are inclined upwardly from those in the preceding flight 18c and driven at successively higher speeds so that the cane stalks not only continue to be accelerated by successive conveyors but also provided with an upward component of velocity.

As the stalks leave the delivery end of the last conveyor in the fourth flight 18d they are projected across a slotlike, transversely extending, gap or vertical discontinuity 80. During their passage across the gap 80, the stalks are traveling with sufficient velocity to become at least partially airborne. While the stalks are in their airborne condition they are subjected to an upward blast of air under pressure from a nozzle 82 supplied with air under pressure from a conventional source (not shown), aligned with and extending transversely the gap 80. The blast of air removes loose leaves and other trash moving with the stalks. The airborne condition of the stalks causes them to be in a loosely separated condition which facilitates the flushing action of the air jet directed through them by minimizing the possibility that trash may become clogged between adjacent stalks.

The blast of air carries the trash into a cowl 84 (connected to a conventional suction source not shown) positioned above the gap 80, and delivered from there to a conventional straw chopper unit 86 (FIG. 4). This chopper unit may be of the type disclosed in Canadian Pat. No. 427,744, although other conventional trash chopping units may be utilized. The chopped trash is delivered from the chopping unit 86 by a blower 88 to a conventional cyclone separator 90.

Downstream of the gap 80, the cane stalks still moving rapidly in the direction of travel of the second series 18, fall onto a downwardly inclined, transversely extending, receiving plate 92 by means of which they are directed to the fifth group 18e of conveyors which are aligned in an upwardly inclined relation. The last conveyor in the fifth group 18e feeds the stalk to the first of the sixth group 18f of conveyors disposed in horizontally aligned relation. The last of the conveyors in the sixth group 18f feeds to the first conveyor of the final conveyor group 18g which are aligned in upwardly inclined relation relative to the sixth flight 18f.

At the junction between conveyor groups 18f and 18g, the leading ends of stalks are lifted, when engaged by the first conveyor in the group 18g. Since the conveyors in groups 18e, 18f, and 18g are driven at successively higher speeds, the lifted stalk ends are accelerated or jerked in the feed direction so as to further enhance the longitudinal orientation of the stalks.

In the preferred embodiment of the invention, the speed of the final conveyor in the final flight 18g is about 1,500 feet per minute, with speed differentials between some of the various preceding conveyors in the various flights and series in excess of 100 feet per minute. It will be realized that these figures are merely exemplary and other speed ranges may be chosen.

The function of the successively more rapid conveyors in the flights 18e, 18f, and 18g is to continue and progressively accentuate the process of thinning out and aligning the canes longitudinally. At the final conveyor in the final series 18g, the canes are traveling in a single layer thickness with all the canes aligned longitudinally in the direction of motion. This function, it has been found, is particularly assisted by the provision of the upwardly inclined junction between the last conveyor of the sixth flight 18f and the relatively more rapidly moving first conveyor of the final flight 18g.

The Cane Chopping and Realigning Station

The aligned cane stalks traveling longitudinally are delivered from the last of the conveyors in the final flight 18g to the previously mentioned, mating, cutting rolls 28 and 30.

The cutting rolls 28 and 30 are rotatably mounted on surrounding framing. These rolls are positioned adjacent the delivery end of the final one of the conveyors in the group 18g and extend transversely of the stalk feed direction. Each of the chopping rolls 28 and 30 is power-driven and is provided about its periphery with four radially projecting, transversely extending, equally peripherally spaced, resilient, nip members 32. The various nip members 32 on the rolls 28 and 30, which may be fabricated of rubber, are rotationally aligned in pairs so that each pair of nip members 32 move successively into abutting coincidence at the closest adjacent point of the rolls as the rolls 28 and 30 rotate. As the leading end of each cane leaves the last of the conveyors in the flight 18g, it moves towards the rolls 28 and 30 where it is engaged by whichever pair of nip members 32 is currently moving into nipping relation. As the rolls 28 and 30 continue to rotate, the elements 32 are deformed about the cane to grip it securely and to hold the cane firmly between the rolls, while at the same time, simultaneously advancing the cane longitudinally.

To cut the stalk while it is engaged by the nipping portions 32, each of the rolls 28 and 30 is provided with four, transversely extending, radially projecting, knives 34, equally spaced about the cutter roll periphery and located intermediate the gripping elements 32. The knives 34 of rolls 28 and 30 move into intermittent radial and contiguous alignment to sever each stalk transversely of its length while it is moving longitudinally. Thus, rolls 28 and 30 produce chopped portions of stalk of uniform length.

The chopped portions of stalk fall into the previously mentioned hopper 36, from which they are removed by the previously mentioned, upwardly moving, inclined, delivery conveyor 38. Conveyor 38 is provided on its conveying surface with transversely extending bars of ridges 102 to retain the chopped portions of stalk on the conveyor during their upward motion.

At the upper, delivery end of the conveyor 38, the chopped stalks are passed into a hooded chamber 104 to which suction is applied. This suction is applied through a duct 106 connected to a remote suction source (not shown). The air flow, induced by the suction, serves to remove trash from chopped stalks falling from the end of the conveyor 38.

The chopped stalks fall onto the previously mentioned realigning cage 40 (FIGS. 8—11). The realigning cage includes a plurality of longitudinally extending, parallel, flat, upright, relatively high ribs 108 fixedly secured to the general surrounding structure and disposed in a cantilever fashion above the previously mentioned conveyor 42. Conveyor 42 has a conveying surface moving longitudinally of and beneath the aligning cage 40 in a direction away from the delivery conveyor 38.

As shown in FIG. 9, the ribs 108 are uniformly transversely spaced at a distance slightly greater than the length of the chopped portions of stalk so that no chopped portion is capable of falling bridging relation across the top of two adjacent ones of the ribs 108.

Spaced intermediate adjacent ribs 108 are other, relatively low ribs 110 longitudinally coextensive with the ribs 108. The upper portions of the ribs 110 are, however, spaced well below the upper portions of the ribs 108.

It may be considered that the upper portions of each pair of adjacent ribs 108 extending above the ribs 110 define a first channel 112 of greater transverse width than the length of the stalks, into which chopped portions of stalk may fall from the conveyor 38. Similarly, it may be considered that each of the ribs 110 divides the space between each pair of adjacent ribs 108 into two second channels 114, disposed below the first channel 112, and of less transverse extent than the length of the chopped portions of stalk. The only way, therefore, in which a portion of stalk may move from the first channel 112 to the second channel 114 under the action of gravity is for it to become turned into the direction of travel so that the lateral distance between its extremities is less than the width of the second channel.

The manner in which this turning is effected may be considered with reference to one piece of stalk 115 (FIG. 9) dropped from the conveyor 38. As a chopped portion 115 falls, it is likely to land across an upper and a lower rib in a downwardly inclined, laterally extending configuration. At this time its lower, leading end will be engaged by other chopped portions of stalk already moving within the second channel to impart the required turning effect, if the stalk does not fall by gravity into the second channel. Stalks within the second channels 114 are moved longitudinally thereof by the underlying conveyor 42.

Downstream of the conveyor 42, the ribs 108 are reduced in height to equal the ribs 110 and at the same time the ribs commence to be curved downwardly and outwardly away from the delivery end of the conveyor 42. An under-plate 116 is secured to the underside of the ribs downstream of the conveyor 42 to support the chopped portions of stalk in the second channels 114 subsequent to delivery from the conveyor 42. The junction between the ribs and the under-plate 116 is provided with rounded gusset portions 117 to prevent jamming and binding of the stalks in the second channels.

The ribs defining the second channels are progressively converged downstream of the conveyor 42 to accentuate the longitudinal aligning effect exerted on the chopped portions of stalk.

It will be appreciated that at the downstream end of the realigning cage 40, substantially all the chopped portions of stalk are aligned in parallel relation, traveling longitudinally in a common direction. As previously discussed, they are, of course, in a clean and uniformly chopped condition suitable for subsequent processing.

Instead of using a single conveyor 42 positioned beneath the realigning cage 40, it may be advisable under some circumstances to utilize a plurality of successively more rapidly moving conveyors arranged in cascade in order to thin out the chopped stalks within the channels 114 in the direction of feed.

ALTERNATIVE EMBODIMENTS

A first alternative embodiment of the invention is illustrated in FIGS. 12 and 13. This first alternative embodiment is identical to the preferred embodiment just described insofar as concerns its portion upstream of the previously described receiving plate 92.

Downstream of the receiving plate 92, however, there is provided an intermediate flight 18'e of aligned, successively more rapidly moving, horizontally disposed conveyors delivering the cane stalks to an upwardly inclined, faster moving conveyor 18'g. The stalks are fed from the delivery end of the conveyor 18'g through chopping rolls 28 and 30, of the type previously described, and fall subsequent to chopping onto another receiving plate 120. The receiving plate, which is inclined downwardly, directs the chopped portions of stalk to an upwardly inclined conveyor 18'h which in turn delivers the stalks to a downwardly inclined, cleaning conveyor 18'k (to be described in more detail hereinafter).

The conveyor 18'k delivers the stalks to two further conveyors 18'h and 18'k similarly to the conveyors 18'h, 18k from which the chopped portions of stalks are transferred to a delivery conveyor 18'l for delivery to a hopper 36 of the type provided in the first embodiment. Downstream of the hopper 36 the structure is identical to that for the first embodiment.

At the rolls 28 and 30 positioned between the conveyors 18'e and 18'g, a second series of air blast nozzles 126 is positioned, directed to blast air upwardly at a forward inclination through the mass of stalks subsequent to chopping thereof to assist in clearing trash therefrom. To further assist in removing the trash, a shroud 130 extends about all the conveyors intermediate the cowl 84 and the delivery extremity of the conveyor 18'e. The shroud 130 is provided with suction points 131 spaced above and adjacent the cutting rolls 28 and 30, the upper junctions of the pairs of conveyors 18' h and 18' k, and the upper end of the delivery conveyor 18' e. From these suction points 131, trash is sucked outwardly of the shroud 130 (by conventional means not shown), and delivered through a conduit 132 to the previously mentioned cyclone separator 90. It will be noted that in view of the chopping step performed at the rolls 28 and 30, the trash itself will have been simultaneously chopped so that it is not necessary to pass the trash extracted downstream of the chopping rolls 28 and 30 through the previously mentioned trash chopper 86.

Each of the previously mentioned cleaning conveyors 18'k, receiving cane from the delivery end of the preceding conveyor 18'h, includes an endless, flexible belt-type foraminous screen, providing a conveying surface 134. An impervious diaphragm 135 within the conveyor 18'k, spaced from the conveying surface 134, defines a plenum chamber 136 therewith. Suction is applied to the plenum chamber 136 through a conduit 138 connected to the inlet side of an air-blower 140. The suction causes trash travelling with the cane stalks to become adhered to the conveying surface 134 and carried downwardly with the cane. Adjacent the lower delivery end of the conveying surface 134 of the conveyor 18'k, there is positioned a downwardly and rearwardly curving scoop 142 having its leading end positioned generally on a level with the conveying surface 134. As the relatively heavy chopped cane stalks reach the bottom of the conveyor 18'k they tend to fall outwardly of the scoop 142 onto the next succeeding conveyor 18'h. The trash, however, remains adhered to the conveying surface 134 of the screen by the suction applied and is thereby carried rearwardly, past the scoop 142. Eventually, the screen 134 goes past the extreme end of the diaphragm 135 at which time the screen becomes blanked off from the source of suction so that the no longer adhered trash tends to fall down into the scoop 142 from which it is conducted off to a trash conduit 144. As some of the trash will become embedded within the surface of the screen or may remain attached thereto (if, for example, the leaves of cane should be wet for some reason), it is necessary to blow them off during their nonconveying travel. This trash removal function is performed by a nozzle 146 positioned to blow air through the returning conveyor belt. The nozzle 146 is supplied with air under pressure from the outlet side of the previously mentioned blower 140. The trash blown outwardly from the returning side of the conveyor belt is directed to the previously mentioned trash removal conduit 144.

A second alternative embodiment of the invention illustrated in FIG. 14 includes the provision of a water spray or "laundry" station 148 interposed in the second series 18 of conveyors in the position occupied in the preferred embodiment by the intermediate flight of conveyors 18b. The water spray station 148 includes a housing 150 enclosing a plurality of aligned, horizontally disposed, perforate or screen-type conveyors 18'm. Water spray nozzles 152 are positioned in the housing 150 above the conveyors 18'm to wash mud and the like off any particularly dirty cane which it may be required to process from time to time. Additional downwardly directed water sprays 154 are positioned within the conveyors 18'm to direct water downwardly through the returning undersides of the conveyors 18'm to wash off trash adhering thereto.

SUMMARY OF ADVANTAGES

It will be seen that the method and apparatus of the present invention provide for very effective preparation of sugar cane stalks prior to subsequent processing. The invention is particularly suitable for receiving bulk masses of randomly oriented cane stalks and delivering them for subsequent processing in cleaned condition, chopped into short, uniform lengths.

As a collateral function, the invention is adapted to align the chopped stalks for travel longitudinally and in the same direction.

A most important feature of the invention resides in the manner in which individual cane stalks are subjected to a number of violent dropping motions, with simultaneous acceleration of leading portions of individual stalks in downstream directions. At separate times, these accelerations are transversely inclined of each other, thereby efficiently disentangling the stalks in the mass. This unusual motion imparted to the stalks is effective to dislodge stalks which, by reason of their bent and twisted nature, have become firmly hooked about other stalks.

Also of particular significance is the right angle junction which not only assists in providing the just-mentioned disentangling effect, but also causes lateral toppling of the other canes which assists in laterally spreading the mass of canes on the conveyors during their travel.

Other advantages are provided by the group of horizontally aligned conveyors delivering cane to the group of faster moving, upwardly inclined conveyors. This arrangement has been found to contribute very substantially towards the ultimate alignment of all the stalks longitudinally in a common direction of travel, and travelling as a single, spaced cane layer, by the time at which they arrive at the chopping station.

It will be appreciated that the alignment of the stalks is very significant in ensuring that the transversely extending chopping rolls cut the stalks into shorter portions possessing an unusually high degree of uniformity of length. In this connection, the resilient portions on the chopping rolls which both grip and advance the stalks during chopping are very important.

Other important aspects of the invention reside in the position of the gaps between the heavy-duty conveyors in the first series of conveyors which cause heavy debris such as rocks mixed with the trash to gravitate outwardly of the mass rearwardly of the direction of travel at an early stage.

Further cleaning advantages are provided by the detrashing apparatus in which the provision of an air blast, adapted to operate upon cane stalks while the latter are in a loosened, airborne condition, substantially eliminates clogging problems and thereby leads to much enhanced trash removal.

Although the invention is described with reference to certain preferred embodiments, it will be apparent to those skilled in the art that additions, deletions, modifications, substitutions and other changes not specifically described and illustrated in the preferred embodiments may be made within the purview of the appended claims.

I claim:

1. A method of preparing a mass of randomly oriented slender sugarcane stalks for subsequent processing, the method comprising the steps of:

delivering the randomly oriented mass of sugarcane stalks onto a series of conveyor means;

subjecting the mass of stalks to a sudden vertical deflection at a first junction between two of the conveyor means in the series to cause the leading portions of individual stalks in the mass to experience an abrupt deflecting motion in the vertical direction and simultaneously subjecting the leading edge portions of the stalk to a force in the direction of travel of the conveyor means downstream of the first junction tending to accelerate the individual stalks in the direction of travel of the conveyor means receiving the stalks with the force aligned with the direction of travel of the conveyor means upstream of the first junction;

subjecting the mass of stalks to another sudden vertical deflection at a second junction between successive conveyor means in the series to cause the leading portions of individual stalks in the mass to experience an abrupt deflecting motion in a vertical direction and simultaneously subjecting the leading edge portions of the stalks to a force in the direction of travel of the conveyor means downstream of the second junction with the force inclined transversely to the direction of travel of the conveyor means upstream of the second junction;

accelerating the mass along the conveyor means to cause the mass of stalks to become thinned in the direction of travel;

raking the upper portion of the mass of stalks during travel to assist in thinning the mass in the direction of travel and to assist in spreading the mass of stalks laterally of the direction of travel; chopping the stalks transversely thereof into relatively shorter lengths, the chopping of the stalks including the steps of:

periodically gripping portions of the stalks between mating surfaces moving in alignment with the stalks to advance the stalks longitudinally; and severing the stalks transversely thereof while in the gripped condition at a point rearwardly adjacent the gripped portion of the stalk;

delivering the chopped stalks to a work station; and directing fluid through the stalks at some point during their travel to remove trash.

2. A method of preparing a mass of randomly oriented slender sugarcane stalks for subsequent processing, the method comprising the steps of:

delivering the mass of randomly oriented sugarcane stalks to the first of a series of separate conveyor means arranged to successively receive and convey the mass of stalks;

subjecting the mass of stalks to a sudden vertical deflection in one direction at a first junction between successive conveyor means in the series to cause the leading edge portions of individual canes in the mass to experience abrupt deflecting motion in the one vertical direction and simultaneously subjecting the leading edge portions to a force aligned with the direction of travel of the conveyor means upstream of the first junction in the direction of travel of the conveyor means downstream of the first junction tending to accelerate the individual stalks in the direction of travel of the conveyor means receiving the stalks;

subjecting the mass of stalks to another vertical deflection in an opposite direction to the first vertical direction at a second junction between successive conveyor means in the series to cause the leading portions of individual stalks in the mass to experience an abrupt deflecting motion in an opposite vertical direction and simultaneously subjecting the leading edge portions of the individual stalks to a force in the direction of travel of the conveyor means receiving the stalks downstream of the second junction but with the force applied to the leading edge portions of the stalks downstream of the second junction inclined transversely to that applied to the leading edge portions of the stalks upstream of the second junction;

chopping the stalks transversely thereof into relatively shorter lengths while the stalks are traveling in longitudinal alignment with the direction of travel;

raking the stalks in the upper part of the mass thereof at some point in their travel to spread the stalks;

dropping the chopped stalk portions onto a plurality of parallel longitudinal equally spaced ribs with alternate ones of the ribs projecting vertically above the other of the ribs at a spacing apart a small amount greater than the length of the chopped portions of the stalk;

directing the fluid through the stalks at some point in their travels to remove the trash therefrom; and delivering the aligned chopped sugarcane stalks to a work station for longitudinal splitting and depithing.

3. A method as defined in claim 1 wherein the step of directing fluid through the stalks includes:

transferring the chopped stalks onto downwardly inclined second conveyor means having a foraminous surface;

applying suction internally of the conveyor means to adhere the trash to the foraminous surface of the conveyor means;

delivering the stalks from a downstream end of the conveyor means while continuing to apply suction to adhere the trash to the foraminous surface of the conveyor means;

ceasing suction at a point downstream of the point at which the cane stalks were delivered to cause the trash to fall from the conveyor means; and conveying the trash to a separate location.

4. In a method wherein a mass of trash-containing randomly oriented slender sugarcane stalks is prepared for subsequent longitudinal splitting and depithing of each individual stalk, the improvement which comprises:

delivering the randomly oriented mass of sugarcane stalks onto conveyor means;

subjecting the mass of stalks to a sudden vertical deflection at a first junction between two of the conveyor means in the series to cause the leading portions of individual stalks in the mass to experience an abrupt deflecting motion in the vertical direction and simultaneously subjecting the leading edge portions of the stalk to a force in the direction of travel of the conveyor means downstream of the first junction tending to accelerate the individual stalks in the direction of travel of the conveyor means receiving the stalks with the force aligned with the direction of travel of the conveyor means upstream of the first junction;

subjecting the mass of stalks to another sudden vertical deflection at a second junction between successive conveyor means in the series to cause the leading portions of individual stalks in the mass to experience an abrupt deflecting motion in a vertical direction and simultaneously subjecting the leading edge portions of the stalks to a force in the direction of travel of the conveyor means downstream of the second junction with the force inclined transversely to the direction of travel of the conveyor means upstream of the second junction;

wherein at the time of reaching a final one in the series of conveyor means, substantially all of the stalks in the mass are aligned longitudinally in the direction of travel of the final one of the conveyor means; and chopping the stalks transversely thereof into relatively shorter chopped lengths as the stalks are fed outwardly from the final one of the conveying means.

5. A method as defined in claim 14, further including the step of:

directing fluid through the mass of stalks at some point during their travel to remove trash mixed with the stalks.

6. A method as defined in claim 14 including an additional realigning step subsequent to the step of chopping the stalks, the realigning step including:

receiving the chopped lengths of stalks; and guiding the chopped lengths of the stalks into parallel longitudinal alignment one with another.

7. A method as defined in claim 16 wherein the step of guiding the chopped lengths of the stalks includes:

dropping the chopped lengths of stalk randomly into a plurality of parallel, longitudinally extending first channels of greater transverse extent than that of the chopped length of the stalk, the channels being provided by longitudinally and vertically extending sidewalls;

diving dividing each of the first channels into at least two, second longitudinally extending channels by providing at least one intermediate wall between and spaced below the sidewalls, each of the second channels being of less transverse extent than that of the chopped length of stalk whereby the chopped lengths fall from the first into the second channels;

providing third conveyor means beneath the walls to move the chopped lengths along the second channels; and converging the walls defining the second channels in the direction of motion of the third conveyor means to progressively longitudinally align the chopped length of the stalk.

8. A method as defined in claim 16 including the step of:

directing fluid through the stalks at some point during their travel to remove trash mixed with the stalks.

9. In a method wherein a mass of trash-containing randomly oriented slender sugarcane stalks is prepared for subsequent longitudinal splitting and depithing of each individual stalk, the improvement which comprises:

delivering the randomly oriented mass of sugarcane stalks onto conveyor means;

subjecting the mass of stalks to a sudden vertical deflection at a first junction between two of the conveyor means in the series to cause the leading portions of individual stalks in the mass to experience an abrupt deflecting motion in the vertical direction and simultaneously subjecting the leading edge portions of the stalk to a force in the direction of travel of the conveyor means downstream of the first junction tending to accelerate the individual stalks in the direction of travel of the conveyor means receiving the stalks with the force aligned in the direction of travel of the conveyor means upstream of the first junction;

subjecting the mass of stalks to another sudden vertical deflection at a second junction between successive conveyor means in the series to cause the leading portions of individual stalks in the mass to experience an abrupt deflecting motion in a vertical direction and simultaneously subjecting the leading edge portions of the stalks to a force in the direction of travel of the conveyor means downstream of the second junction with the force inclined transversely to the direction of travel of the conveyor means upstream of the second junction;

accelerating the mass along the conveyor means to cause the mass of stalks to become thinned in the direction of travel;

raking the upper portion of the mass of stalks during travel to assist in thinning the mass in the direction of travel and to assist in spreading the mass of stalks laterally of the direction of travel;

chopping the stalks transversely thereof into relatively shorter lengths, the chopping of the stalks including the steps of:

periodically gripping portions of the stalks between mating surfaces moving in alignment with the stalks to advance the stalks longitudinally; and severing the stalks transversely thereof while in the gripped condition at a point rearwardly adjacent the gripped portion of the stalk;

directing fluid through the stalks at some point during their travel to remove trash, guiding the chopped stalks into parallel longitudinal alignment with one another; and delivering the aligned chopped stalks to a work station for longitudinal splitting and depithing of the chopped stalks individually.

10. A method of preparing cane stalks for subsequent processing, the method comprising the steps of:

dumping the stalks in a randomly oriented mass comprising at least several tons, on conveyor means;

accelerating the mass along the conveyor means to cause the mass of stalks to become thinned in the direction of travel;

raking the upper portion of the mass of stalks during travel to assist in thinning the mass in the direction of travel and to assist in spreading the mass of stalks laterally of the direction of travel;

providing at least one abrupt bend in the conveyor means at which the direction of travel downstream of the bend is substantially transverse to the direction of travel upstream of the bend to cause a centrifugal toppling effect to be exerted on stalks in the upper part of the mass thereof relative to stalks in the lower part thereof at the bend tending to spread the stalks laterally of the conveyor means downstream of the bend;

aligning the stalks longitudinally in the direction of travel of the conveyor means;

whereby a flow of stalks substantially a single layer thick with individual stalks aligned in the direction of feed of the conveyor means is achieved; and chopping the stalks transversely thereof into relatively shorter lengths, the step of chopping the stalks including the steps of:

periodically gripping portions of the stalks between resilient, mating surfaces moving in alignment with the stalks to advance the stalks longitudinally; and severing the stalks transversely thereof while in the gripped condition at a point rearwardly adjacent the gripped portion of the stalk.

PO-1050
(5/69)

UNITED STATES PATENT OFFICE
CERTIFICATE OF CORRECTION

Patent No. __3,566,944__   Dated __March 2, 1971__

Inventor(s) __Sydney E. Tilby__

It is certified that error appears in the above-identified patent and that said Letters Patent are hereby corrected as shown below:

IN THE ABSTRACT

Column 2, line 1, after "At" insert -- at -- .

IN THE SPECIFICATION

Column 2, line 30, insert -- and -- after "these,".
Column 4, line 36, change "talk" to -- stalk -- .

IN THE CLAIMS

Claim 5, line 1, change "14" to -- 4 -- .
Claim 6, line 1, change "14" to -- 4 -- .
Claim 7, line 1, change "16" to -- 6 -- .
        line 8, delete "diving" .
Claim 8, line 1, change "16" to -- 6 -- .

Signed and sealed this 16th day of November 1971.

(SEAL)
Attest:

EDWARD M. FLETCHER, JR.
Attesting Officer

ROBERT GOTTSCHALK
Acting Commissioner of Pa